United States Patent [19]
Hackel et al.

[11] Patent Number: 5,739,418
[45] Date of Patent: Apr. 14, 1998

[54] VIBRATION PICK-UP AND METHOD OF PRODUCING THE SAME

[75] Inventors: Uwe Hackel, Gerlingen; Volker Woehl, Rettenberg; Holger Krebs, Erdmannhausen, all of Germany

[73] Assignee: Robert Bosch GmbH, Stuttgart, Germany

[21] Appl. No.: 811,375

[22] Filed: Mar. 4, 1997

[30] Foreign Application Priority Data

Mar. 29, 1996 [DE] Germany ............ 196 12 541.3

[51] Int. Cl.[6] ............................................ G01L 23/22
[52] U.S. Cl. .................. 73/35.11; 73/702; 73/756; 73/35.09
[58] Field of Search .............. 73/756, 702, 35 P, 73/654, 35.01–35.17; 123/425, 435

[56] References Cited

U.S. PATENT DOCUMENTS

| | | | |
|---|---|---|---|
| 4,869,095 | 9/1989 | Komuraski | 73/35.11 |
| 4,966,031 | 10/1990 | Mochizuki | 73/35.11 |
| 5,125,263 | 6/1992 | Komuraski et al. | 73/35.11 |
| 5,150,606 | 9/1992 | Komuraski et al. | 73/35.09 |
| 5,329,809 | 7/1994 | Sellnau et al. | 73/115 |
| 5,398,540 | 3/1995 | Entenmann et al. | 73/35.11 |
| 5,440,933 | 8/1995 | Brammer et al. | 73/756 |

FOREIGN PATENT DOCUMENTS

4403660A1  10/1994  Germany.

*Primary Examiner*—Hezron E. Williams
*Assistant Examiner*—Rose M. Miller
*Attorney, Agent, or Firm*—Michael J. Striker

[57] ABSTRACT

In a vibration pick-up having a pressure sleeve with a central opening for a mounting element and a supporting surface to be supported on a component to cause vibrations, a detection member is pre-tensioned in an axial direction with a disk spring radially outwardly of the pressure sleeve, and the disk spring is connected with the pressure sleeve by a laser welding seam over a whole periphery of the pressure sleeve.

9 Claims, 1 Drawing Sheet

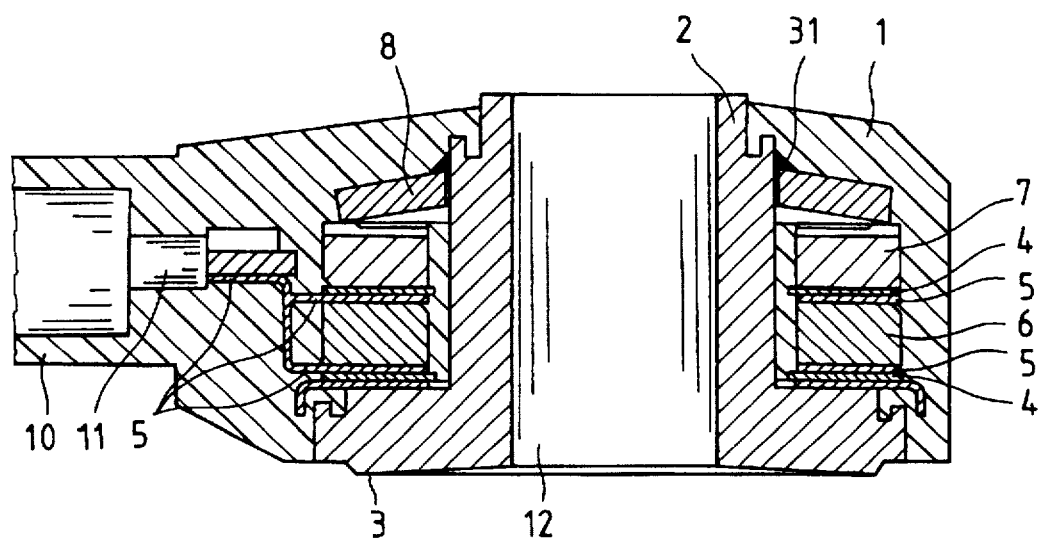

VIBRATION PICK-UP AND METHOD OF PRODUCING THE SAME

BACKGROUND OF THE INVENTION

The present invention relates to a vibration pick-up as well as to a method of producing the vibration pick-up.

Vibration pick-ups are known in the art. One of such vibration pick-ups is disclosed for example in the German patent document DE-OS 44 03 660. The vibration pick-up disclosed in this document has a metallic pressure sleeve which is utilized in knock sensors for internal combustion engines. The vibration pick-up is fixedly joined over a supporting region to a component whose vibrations must be detected. The vibrations to be detected are here knock noises of the internal combustion engine during its operation. They are supplied through the pressure sleeve to a piezo-ceramic detector and converted into an evaluatable output signal of the vibration pick-up which operates as a knock sensor. The type of mounting or clamping of this detector in the pressure sleeve and the mounting on the vibrating component have a great influence on the manufacture of the vibration pick-up.

SUMMARY OF THE INVENTION

Accordingly, it is an object of the present invention to provide a vibration pick-up which is a further improvement of the known vibration pick-ups, as well as a method of producing the vibration pick-up which is better than the existing methods.

In keeping with these objects and with others which will become apparent hereinafter, one feature of the present invention resides, briefly stated, in a vibration pick-up with a pressure sleeve in which a disk spring of the vibration pick-up is laser-welded with the pressure sleeve over its whole periphery.

In accordance with the inventive method, the vibration pick-up is produced by laser welding of the disk spring with the pressure sleeve over the whole periphery of the pressure sleeve.

When the disk spring is mounted on the pressure sleeve by laser welding, no complicated mechanical mounting steps are needed, such as for example screwing of a threaded ring during assembly of the vibration pick-up. With the known screwing of a threaded ring, turning of the sensitive detecting means is possible. In contrast, in the inventive vibration pick-up the required pressure which is needed for a mechanical pre-tensioning during clamping of the detection means, is produced exclusively axially.

In accordance with a further advantageous feature of the inventive method, the disk spring is welded under the action of an axial pre-tensioning also during the assembly with a laser over the whole periphery of the pressure sleeve. After hardening of the welding seam, the pre-tensioning is maintained, and the whole arrangement of the pressure sleeve with the clamped detecting means can be injection molded around with a synthetic plastic. A component which produces vibrations, such as for example the motor block of a motor vehicle, can be then screwed on it.

In accordance with a further feature of the present invention, the pressure sleeve can be composed of metal, for example steel or brass.

In accordance with a further feature of the inventive method, for production of the laser welding, a laser beam is moved circularly on the connecting point between the disk spring and the pressure sleeve.

The novel features which are considered as characteristic for the present invention are set forth in particular in the appended claims. The invention itself, however, both as to its construction and its method of invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view showing a longitudinal section of a vibration pick-up and illustrating a method of producing the same, wherein the vibration pick-up is formed as a knock sensor.

DESCRIPTION OF PREFERRED EMBODIMENTS

A vibration pick-up in accordance with the present invention is illustrated in FIG. 1 as a knock sensor for an internal combustion engine. The vibration pick-up has a housing identified with reference numeral 1. A pressure sleeve 2 is arranged in the housing. The pressure sleeve 2 has a lower support surface 3, with which it is supported on a not shown housing of a motor whose vibrations must be detected.

Several further parts of the vibration pick-up in accordance with the present invention are arranged on an outer periphery of the pressure sleeve 2 starting from its lower supporting surface. These parts include an insulating disk 4, a contact disk 5, a piezo-ceramic disk 6 which forms a detection means, a second contact disk 5, and a second insulating disk 4. A seismic mass 7 is mounted on this arrangement. The seismic mass 7 together with a disk spring 8 which is mounted on the pressure sleeve 2 produces a pre-tensioning axially in direction of the seismic 7 and the piezo-ceramic disk 6.

The pick-up further has an integrated connection part 10 composed of synthetic plastic material, for example of polyurethane (PUR) or glass-fiber-reinforced polyamide (PA66 GF35). A connecting cable 11 is produced by injection molding in the integrated connecting part 10 and in the housing 1 produced by injection molding process. The conductors or wires of the connecting cable 11 are connected with both contact disks 5 at both sides of the piezo-ceramic disks 6. They transmit the electric voltage which is produced when a pressure load is applied to the ceramic disk 6. A not shown mounting screw extends through a central opening or bore 12 in the pressure sleeve 2. The mounting screw mounts the knock sensor directly or indirectly on the housing of the internal combustion engine.

During the mounting of the knock sensor the total torque applied by the mounting screw is transmitted to the pressure sleeve 2. In other words, no force acts during the mounting on the piezo-ceramic disk 6. The required clamping force for the piezo-ceramic disk 6 is produced when the disk spring 8 first is pressed mechanically on the seismic mass 7, and then the connecting area between the disk spring 8 and the metallic pressure sleeve 2 is welded with a laser over the whole periphery of the pressure sleeve 2. The process involves laser welding with production of a welding seam 31. After the required cooling or hardening of the welding seam 31, the pre-tensioning is retained without outer actions.

The remaining pre-tensioning force is selected so that the axial forces applied to the piezo-ceramic disk 6 are active without worsening of its electrical signal, and they are substantially independent from thermal expansion as well as unavoidable compression of the pressure sleeve 2 during the mounting. The pulses applied by the seismic mass 7 proportionally to the vibrations of the external combustion engine are converted in the piezo-ceramic disk 6 into voltage pulses. These voltage pulses are readable by a corresponding measuring device or further transmitting to a control device.

The pressure sleeve 2 can be composed of metal, for example of steel, brass, and the like.

It will be understood that each of the elements described above, or two or more together, may also find a useful application in other types of methods and constructions differing from the types described above.

While the invention has been illustrated and described as embodied in vibration pick-up and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A vibration pick-up, comprising a pressure sleeve having a central opening for receiving a mounting element and a supporting surface for supporting on a component whose vibrations are to be detected; a detection member; a disk spring holding said detection member radially outwardly on said pressure sleeve with an axial pre-tensioning; and connecting means for connecting said disk spring with said pressure sleeve, said connecting means including a laser welding seam which connects said disk spring with said pressure sleeve over a whole periphery of said pressure sleeve, so that said disk spring is fixedly connected with said pressure sleeve and at the same time maintains the axial pre-tensioning.

2. A vibration pick-up as defined in claim 1, wherein said laser seam extends in a circumferential direction around said pressure sleeve over the whole periphery.

3. A vibration pick-up as defined in claim 1, wherein said pressure sleeve is composed of metal.

4. A vibration pick-up as defined in claim 1, wherein said pressure sleeve is composed of steel.

5. A vibration pick-up as defined in claim 1 wherein said pressure sleeve is composed of brass.

6. A method of producing a vibration pick-up, comprising the steps of making a pressure sleeve with a central opening for receiving a mounting element and with a supporting surface for supporting on a component causing vibrations; arranging a detection member radially outwardly of said pressure sleeve; arranging a detection member radially outwardly of said pressure sleeve; placing a disk spring so that said disk spring holds said detection member radially outwardly on said pressure sleeve with an axial pre-tensioning; and laser-welding said disk spring with said pressure sleeve to produce a laser welding seam over a whole periphery of said pressure sleeve, so that said disk spring is fixedly connected with said pressure sleeve and at the same time maintains the axial pre-tensioning.

7. A method as defined in claim 6, wherein said laser-welding includes producing the laser welding seam which extends circumferentially around the pressure sleeve over the whole periphery of the pressure sleeve.

8. A method as defined in claim 6, wherein said laser welding includes welding during action of an outer axial pre-tensioning during assembly of said disk spring over the whole periphery around the pressure sleeve, and after hardening of the laser welding seam retaining the pre-tensioning without outer actions.

9. A method as defined in claim 6, wherein said laser welding includes moving a laser beam circularly along a connecting area between said disk spring and said pressure sleeve.

\* \* \* \* \*